United States Patent
Calendino et al.

(10) Patent No.: US 8,141,158 B2
(45) Date of Patent: Mar. 20, 2012

(54) MEASURING COVERAGE OF APPLICATION INPUTS FOR ADVANCED WEB APPLICATION SECURITY TESTING

(75) Inventors: Robert Calendino, Nepean (CA); Craig Ronald Earl Conboy, Kanata (CA); Ashish Patel, Edmonton (CA); Guy Podjarny, Ottawa (CA); Jeffrey Charles Turnham, Newmarket (CA)

(73) Assignee: International Business Machines Corporation, Armonk, NY (US)

( * ) Notice: Subject to any disclaimer, the term of this patent is extended or adjusted under 35 U.S.C. 154(b) by 587 days.

(21) Appl. No.: 12/347,093

(22) Filed: Dec. 31, 2008

(65) Prior Publication Data

US 2010/0169974 A1 Jul. 1, 2010

(51) Int. Cl.
*G06F 11/00* (2006.01)

(52) U.S. Cl. .......................................... 726/25
(58) Field of Classification Search ....................... 726/25
See application file for complete search history.

(56) References Cited

U.S. PATENT DOCUMENTS

| | | | |
|---|---|---|---|
| 7,207,065 B2 | 4/2007 | Chess et al. | |
| 7,571,482 B2 * | 8/2009 | Polyakov et al. | 726/24 |
| 7,761,918 B2 * | 7/2010 | Gula et al. | 726/23 |
| 2003/0159063 A1 | 8/2003 | Apfelbaum et al. | |
| 2005/0246390 A1 | 11/2005 | House et al. | |
| 2007/0159190 A1 | 7/2007 | Lee et al. | |
| 2007/0208822 A1 * | 9/2007 | Wang et al. | 709/217 |

OTHER PUBLICATIONS

Li-Chiou et al. ,The open Web Application Project (OWASP),Software Assurance Maturity Model, Version 1.0,released Mar. 25, 2009.*
Adam Doupe et al. , An Analysis of Black-box Vulnerability Scanners.*
C.C. Michael, Cigital, Inc., Black Box Security Testing Tools, Dec. 28, 2005, updated Jul. 27, 2009 by Ken van Wyk.*
Bai et al., "A Multi-Agent Based Framework for Collaborative Testing on Web Services", IEEE Computer Society, 2006, pp. 1-6.
Bai et al., "Adaptive Web Services Testing", IEEE Computer Society, 2007, pp. 1-4.

* cited by examiner

*Primary Examiner* — Kambiz Zand
*Assistant Examiner* — Abiy Getachew
(74) *Attorney, Agent, or Firm* — Yee & Associates, P.C.; Daniel McLoughlin (57) ABSTRACT

A computer implemented method, a data processing system, and a computer usable recordable-type medium having a computer usable program code monitor a black box web application security scan. A black box scan of a web application is initiated. The black box scan sends a test is sent to a plurality of web application inputs of the web application. A runtime analysis is performed on the black box scan of the web application. Based on the run time analysis of the black box scan, the black box scan is modified.

14 Claims, 3 Drawing Sheets

MEASURING COVERAGE OF APPLICATION INPUTS FOR ADVANCED WEB APPLICATION SECURITY TESTING

BACKGROUND OF THE INVENTION

1. Field of the Invention

The present invention relates generally to a computer implemented method, a data processing system, and a computer program product. More specifically the present invention relates to a computer implemented method, a data processing system, and a computer program product for measuring coverage of application inputs for advanced web application security testing.

2. Description of the Related Art

Code coverage is a measure used in software testing for describing the extent to which source code has been exercised during the testing procedure. Code coverage measurements are a form of white box testing, wherein knowledge of the source code is required.

Typical white box code coverage measurements allow the software engineer to obtain data about the execution of the program on a line by line basis. It may also be possible for the software engineer to examine data values held in program variables on a line by line basis.

However, typical white box code coverage measurements are impractical when the analyzed code becomes too large, or when the software engineer has no knowledge of the underlying source code. With no knowledge of the underlying source code, the software engineer must typically rely on black box testing procedures. Black box testing takes an external perspective of the test object to derive test cases. The test designer selects valid and invalid input and determines the correct output. There is no knowledge of the test object's internal structure. That is, the software engineer can only determine whether a correct output was given. In black box testing, the software engineer has no direct knowledge of how the program arrived at the given output.

Black box testing works by sending a test to an application input. While black box testing can uncover unimplemented parts of the specification, the software engineer cannot be sure that all existent paths of the code are tested.

BRIEF SUMMARY OF THE INVENTION

According to one embodiment of the present invention, a computer implemented method, a data processing system, and a computer usable recordable-type medium having a computer usable program code monitor a black box web application security scan. A black box scan of a web application is initiated. The black box scan sends a test to a plurality of web application inputs of the web application. A runtime analysis is performed on the black box scan of the web application. Based on the run time analysis of the black box scan, the black box scan is modified.

DETAILED DESCRIPTION OF THE INVENTION

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
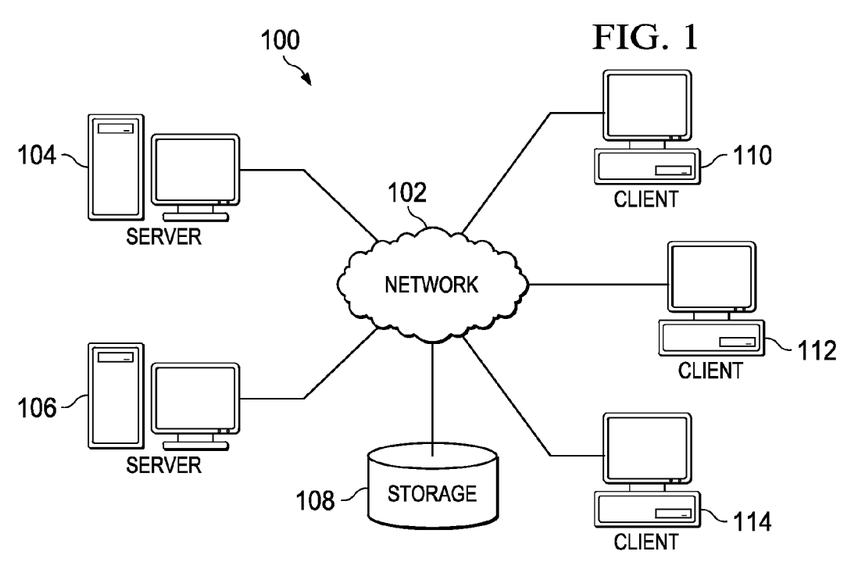
FIG. 1 is a pictorial representation of a network of data processing systems in which illustrative embodiments may be implemented.
Figure 2:
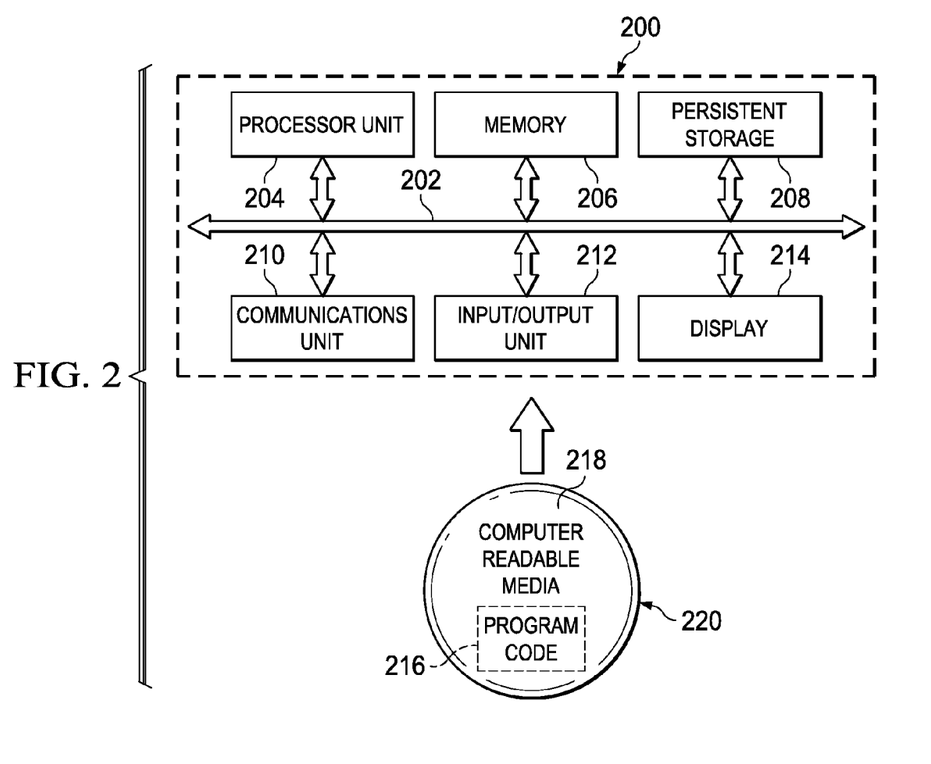
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

Program code located in network data processing system 100 may be stored on a computer recordable storage medium and downloaded to a data processing system or other device for use. For example, program code may be stored on a computer recordable storage medium on server 104 and downloaded to client 110 over network 102 for use on client 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multiprocessor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer recordable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

In some illustrative embodiments, program code 216 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 216 may be a server computer, a client computer, or some other device capable of storing and transmitting program code 216.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

The different embodiments may be implemented using any hardware device or system capable of executing program code. As one example, the data processing system may include inorganic components integrated with organic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208, and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

The illustrative embodiments herein describe a computer implemented method, a computer program product, and a data processing system for gathering information from a run-time analysis in order to improve a black box web application security scan. Instead of using raw code coverage metrics on code thought to be interesting from a security perspective, the illustrative embodiments utilize a run-time analysis to determine which inputs to the application are exercised during the course of the black box scan.

Information is collected during the black box web application security testing on which application inputs are exercised and not exercised during the course of a black box web application security testing. This information is instructive for refining and improving the black box scan. Black box testing works by sending a test to an application input. Therefore, information on what application inputs were not exercised during the course of a test is directly actionable. When an application input is known not to have received a test, the black box scan configuration can be refined in order to include that application input as an exercised input. Through repeated scans and feedback, the black box scan can be optimized to cover each of the application inputs of web application. Feedback control therefore enables an optimally configured black box web application security scan. Configuring an optimal black box scan without feedback control is haphazard, and unlikely to produce complete code coverage.

A computer implemented method, a data processing system, and a computer usable recordable-type medium having a computer usable program code monitor a black box web application security scan. A black box scan of a web application is initiated. The black box scan sends a test is sent to a plurality of web application inputs of the web application. A runtime analysis is performed on the black box scan of the web application. Based on the run time analysis of the black box scan, the black box scan is modified.

Figure 3:
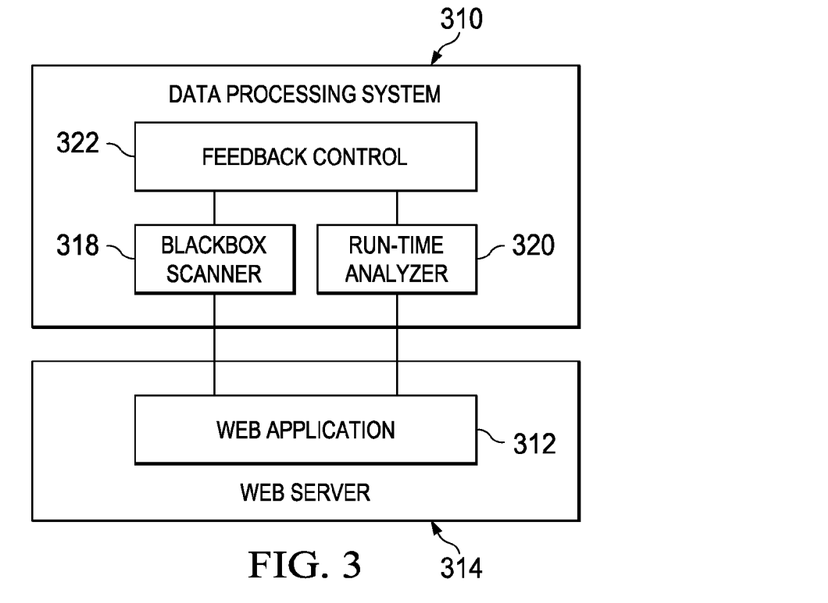
FIG. 3 is a dataflow diagram of a run-time analysis of a black box web application security scan according to an illustrative embodiment.

Referring now to FIG. 3, a dataflow diagram of a run-time analysis of a black box web application security scan is shown according to an illustrative embodiment. Data processing system 310 is a data processing system, such as one of clients 110, 112, and 114 of FIG. 1. Web server 312 is a server, such as one of server 104 and server 106 of FIG. 1.

In one illustrative embodiment, data processing system 310 and web server 312 can be a single data processing system. In such an embodiment, the components shown on data processing system 310 and the components shown on web server 312 may all be implemented on a single data processing system.

Data processing system 310 accesses web application 314 from web server 312. Web application 314 is typically coded in a browser-supported language such as, but not limited to, hypertext markup language, JavaScript, and Java. Web application 314 may be simple interactive web pages that invoke hypertext markup language requests by a user for information on web server 312.

Data processing system 310 includes black box scanner 318. Black box scanner 318 is a software application capable of performing a black box security scan of web application 314. In one illustrative embodiment, black box scanner 318 can be a commercially available black box security web application scanner, such as, for example, but not limited to, Rational AppScan, available from International Business Machines, Corp. Rational is a registered trademark of International Business Machines, Corp. AppScan is a registered trademark of International Business Machines, Corp.

Black box scanner 318 traverses through web application 314 to check for common security problems such as for example, but not limited to, cross site scripting, structured querry language injection, Directory traversal, mis-configurations, remote command execution vulnerabilities, and possible security problems. Black box scanner 318 systematically crawls through web application 314 and parses the output therefrom to identify vulnerabilities in web application 314.

Data processing system further includes run-time analyzer 320. Run-time analyzer 320 is a software application capable of performing run-time analysis on a separately executing application. In one illustrative embodiment, run-time analyzer 320 can be a commercially available run-time analysis software application, such as, for example, but not limited to, Rational PureCoverage, available from International Business Machines, Corp., or a freely distributed run-time analysis software application such as, for example, but not limited to, Eclipse Test and Performance Tools Platform, available from Eclipse, Corp.

Run-time analyzer 320 monitors the execution of web application 314. In one illustrative embodiment, run-time analyzer 320 monitors all potential inputs to web application 314. While black box scanner 318 is running a black box test of web application 314, run-time analyzer 320 monitors the various inputs of web application 314 to determine which of those web application inputs were exercised by the receipt of incoming data, and which of those web application inputs were not exercised.

When black box scanner 318 has completed running its testing of web application 314, run-time analyzer 320 prepares information on the coverage of web application inputs. Run-time analyzer 320 provides information such as the percentage of all application inputs exercised and the list of application inputs that were not exercised is provided. Run-time analyzer 320 could also prepare information on the coverage of web application 314 during the course of the black box scan in more of a continuous feedback loop, rather than in distinct phases.

The information provided by the run-time analyzer 320 is then input into feedback control 322. Feedback control 322 is a software process that refines the tests run by black box scanner 318. Feedback control 322 refines the black box scan such that subsequent runs of the black box scan will cover the previously unexercised application inputs of web application 314. That is, a first run of tests by black box scanner 318 will most likely result in incomplete code coverage due to incomplete testing of the totality of application inputs. Feedback control 322 modifies the black box scan performed by black box scanner 318, such that subsequent runs of the black box scan will cover the previously unexercised application inputs.

Through repeated scans and feedback, the black box scan can be optimized to cover each of the application inputs of web application 314. Feedback control 322 therefore enables an optimally configured black box web application security scan. Configuring an optimal black box scan without feedback control 322 is haphazard, and unlikely to produce complete code coverage.

Figure 4:
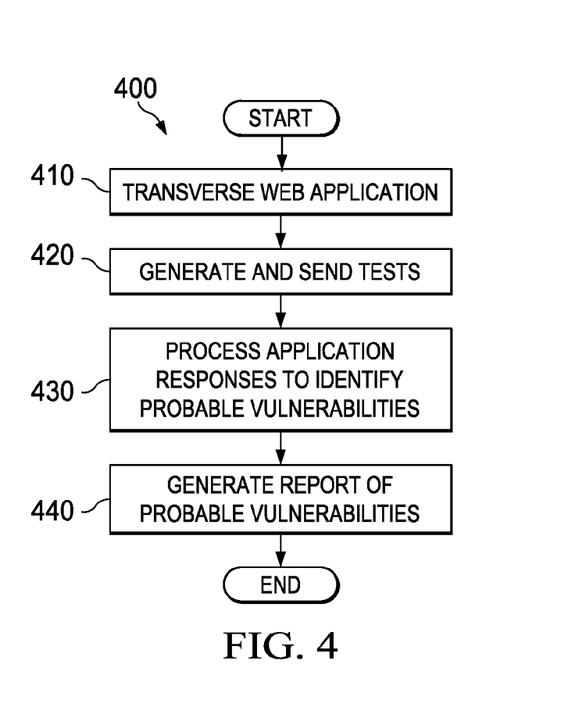
FIG. 4 is a flowchart for providing black box security scans of a web application according to an illustrative embodiment.

Referring now to FIG. 4, a flowchart for providing black box security scans of a web application is shown according to an illustrative embodiment. Process 400 is a software process, executing on a software component such as black box scanner 318 of FIG. 3.

Process 400 begins by traversing a web application (step 410). The Web application can be web application 312 of FIG. 4. Process 400 traverses through the web application to check for common security problems such as for example, but not limited to, cross site scripting, structured querry language injection, directory traversal, mis-configurations, and remote command execution vulnerabilities.

Process 400 generates and sends tests to the web application (step 420). The tests sent to the web application can be tests designed to elicit errors based on common vulnerabilities in web applications. The tests can include, but are not limited to, cross site scripting, structured querry language injection, directory traversal, mis-configurations, and remote command execution vulnerabilities. During the black box scan, process 400 systematically crawls through the web application, sends tests to the application, and parses the output therefrom to identify vulnerabilities in web application.

Responsive to generating and sending tests to the web application, process 400 processes web application responses to identify probably vulnerabilities (step 430). Web application responses may include any error messages encountered in response to the tests sent to the web application. Probable vulnerabilities can be identified from suspicious output by the web application. For example, if JavaScript code is sent to the application in a test, and later the same JavaScript code is returned in a response from the web application, a cross site scripting vulnerability is likely to exist.

Process 400 then generates a report of the probable vulnerabilities (step 440), with the process terminating thereafter. A software engineer can use the parsed suspicious output within the log file to address the suspected vulnerability within the web application.

Figure 5:
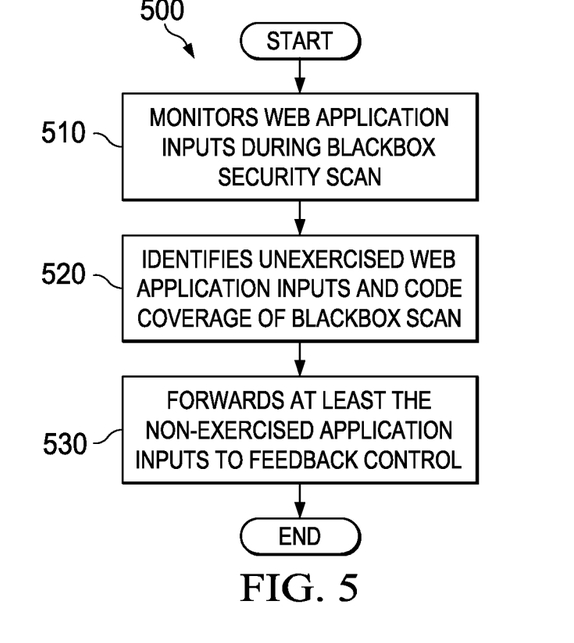
FIG. 5 is a flowchart for providing run-time analysis of an executing web application is shown according to an illustrative embodiment.

Referring now to FIG. 5, a flowchart for providing run-time analysis of an executing web application is shown according to an illustrative embodiment. Process 500 is a software process, executing on a software component such as run-time analyzer 320 of FIG. 3.

Process 500 begins by monitoring web application inputs during a black box security scan (step 510). Process 500 monitors all potential inputs to web application during run time of the web application. While a black box scanner, such as black box scanner 318 shown in FIG. 4, is running a black box test of web application, process 500 monitors the various inputs of into the web application to determine which of those web application inputs were exercised by the receipt of incoming data, and which of those web application inputs were not exercised.

Process 500 then identifies unexercised web application inputs and the code coverage of the black box scan (step 520). Instead of using raw code coverage metrics on code thought to be interesting from a security perspective, a run-time analysis of process 500 identifies which web application inputs are exercised during the course of the black box scan. When each possible inputs to the web application is known, web application inputs that are not exercised during the course of the black box scan can then quickly be identified.

Process 500 then forwards at least the unexercised application inputs to a feedback control for updating the black box scan (step 530), with the process terminating thereafter. The feedback control can be feedback control 322 of FIG. 3. A first run of tests by the black box scanner will most likely result in incomplete code coverage due to incomplete testing of the totality of application inputs. Through repeated scans and feedback of the unexercised application inputs, the black box scan can be optimized to cover each of the application inputs of a web application. Configuring an optimal black box scan without feedback control is haphazard, and is unlikely to produce complete code coverage.

Figure 6:
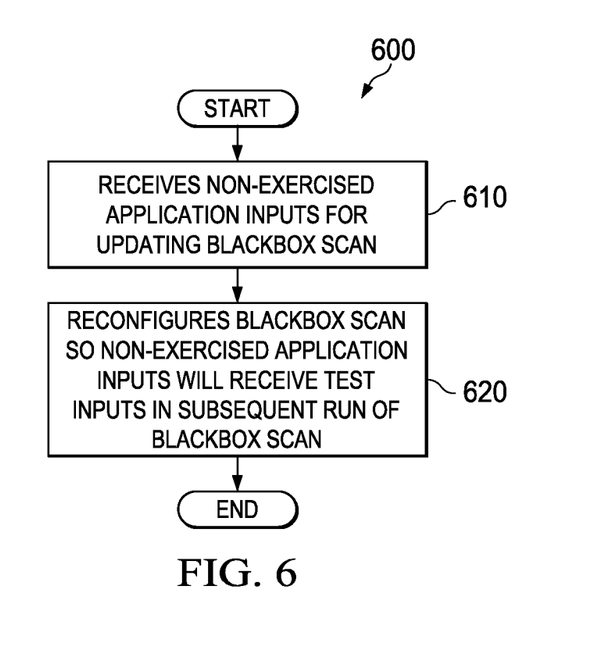
FIG. 6 is a flowchart for updating a black box scan based on runtime analysis feedback of an executing web application according to an illustrative embodiment.

Referring now to FIG. 6, a flowchart for updating a black box scan based on runtime analysis feedback of an executing web application is shown according to an illustrative embodiment. Process 600 is a software process, executing on a software component such as feedback control 322 of FIG. 3.

Process 600 begins by receiving unexercised application inputs for updating the black box scan (step 610). A first run of tests by the black box scanner will most likely result in incomplete code coverage due to incomplete testing of the totality of application inputs. Through repeated scans and feedback of the unexercised application inputs, the black box scan can be optimized to cover each of the application inputs of a web application. Configuring an optimal black box scan without feedback control is haphazard, and is unlikely to produce complete code coverage. Unexercised application inputs show those sections of the web application code that has not been subjected to the black box testing.

Responsive to receiving unexercised application inputs, process 600 reconfigures the black box scan so that the unexercised application inputs will receive test inputs from the black box scanner in a subsequent run of the black box scan (step 620), with the process terminating thereafter. Process 600 modifies the black box scan performed by the black box scanner, such that subsequent runs of the black box scan will cover the previously unexercised application inputs. Through repeated scans and feedback, the black box scan can be optimized to cover each of the application inputs of the web application. Process 600 therefore enables an optimally configured black box web application security scan.

The illustrative embodiments herein describe a computer implemented method, a computer program product, and a data processing system for gathering meaningful information from a run-time analysis in order to improve a black box web application security scan. Instead of using raw code coverage metrics on code thought to be interesting from a security perspective, the illustrative embodiments utilize a run-time analysis to determine which inputs to the application are exercised during the course of the black box scan.

Information on which application inputs are exercised and not exercised during the course of a black box web application security testing is much more instructive for refining and improving the black box scan. Black box testing works by sending a test to an application input. Therefore, information on what application inputs were not exercised during the course of a test is directly actionable. When an application input is known not to have received a test, the black box scan configuration can be refined in order to include that application input as an exercised input.

Thus, the illustrative embodiments, provide a computer implemented method, a data processing system, and a computer usable recordable-type medium having a computer usable program code monitor a black box web application security scan. A black box scan of a web application is initiated. The black box scan sends a test is sent to a plurality of web application inputs of the web application. A runtime analysis is performed on the black box scan of the web application. Based on the run time analysis of the black box scan, the black box scan is modified.

Through repeated scans and feedback, the black box scan can be optimized to cover each of the application inputs of web application. Feedback control therefore enables an optimally configured black box web application security scan. Configuring an optimal black box scan without feedback control is haphazard, and unlikely to produce complete code coverage.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for monitoring a black box web application security scan, the computer implemented method comprising the computer implemented steps of:
   initiating, by a processor, a black box scan of a web application, wherein a test is sent to a plurality of web application inputs of the web application;
   performing, by the processor, a runtime analysis of the black box scan of the web application;
   responsive to performing a runtime analysis of the black box scan of the web application, identifying, by the processor, an exercised web application input from the plurality of web application inputs, wherein the exercised web application input receives data from the test; and
   modifying, by the processor, the black box scan based on the run time analysis of the black box scan to use unexercised web application inputs that did not receive data from the test in a subsequent black box scan of the web application.

2. The computer implemented method of claim 1, further comprising the computer implemented step of:
   preparing, by the processor, information on the coverage of the plurality of web application inputs, wherein the information includes a percentage of the plurality of web application inputs that are exercised, and a percentage of the plurality of web application inputs that are unexercised.

3. The computer implemented method of claim 2, further comprising the computer implemented steps of:
   responsive to preparing information on the coverage of the plurality of web application inputs, forwarding, by the processor, the information to a feedback control; and
   responsive to forwarding the information to a feedback control, modifying, by the processor, the black box scan with the feedback control so that unexercised web application inputs that did not receive data from the test will be exercised by a subsequent black box scan of the web application.

4. The computer implemented method of claim 3, wherein the feedback control is a feedback control loop, the computer implemented method further comprising the computer implemented step of:
   responsive to forwarding the information to a feedback control, modifying, by the processor, the black box scan with the feedback control during runtime so that unexercised web application inputs that did not receive data from the test will be exercised by a subsequent black box scan of the web application.

5. The computer implemented method of claim 1, wherein the computer implemented step of initiating a black box scan of a web application, wherein a test is sent to a plurality of web application inputs of the web application further comprises:
   initiating, by the processor, a black box scan of a web application, wherein a test is sent to a plurality of web application inputs of the web application, wherein the test is selected from the group consisting of cross site scripting, structured query language injection, directory traversal, mis-configurations, and remote command execution vulnerabilities.

6. A data processing system comprising:
   a bus;
   a storage device connected to the bus, wherein the storage device contains computer usable code for monitoring a black box web application security scan;
   a communications unit connected to the bus; and
   a processing unit connected to the bus, wherein the processing unit executes the computer usable code to initiate a black box scan of a web application, wherein a test is sent to a plurality of web application inputs of the web application; to perform a runtime analysis of the black box scan of the web application; responsive to performing a runtime analysis of the black box scan of the web application, identifying, by the processor, an exercised web application input from the plurality of web application inputs, wherein the exercised web application input receives data from the test; and to modify the black box scan based on the run time analysis of the black box scan to use unexercised web application inputs that did not receive data from the test in a subsequent black box scan of the web application.

7. The data processing system of claim 6, wherein the processing unit further executes the computer usable code:
   to prepare information on the coverage of the plurality of web application inputs, wherein the information includes a percentage of the plurality of web application inputs that are exercised, and a percentage of the plurality of web application inputs that are unexercised.

8. The data processing system of claim 7, wherein the processing unit further executes the computer usable code:
responsive to preparing information on the coverage of the plurality of web application inputs, to forward the information to a feedback control; and
responsive to forwarding the information to a feedback control, to modify the black box scan with the feedback control so that unexercised web application inputs that did not receive data from the test will be exercised by a subsequent black box scan of the web application.

9. The data processing system of claim 8, wherein the feedback control is a feedback control loop, wherein the processing unit further executes the computer usable code:
responsive to forwarding the information to a feedback control, to modify the black box scan with the feedback control during runtime so that unexercised web application inputs that did not receive data from the test will be exercised by a subsequent black box scan of the web application.

10. The data processing system of claim 6, wherein the processing unit executing the computer usable code to initiate a black box scan of a web application, wherein a test is sent to a plurality of web application inputs of the web application further comprises the processing unit executing the computer usable code:
to initiate a black box scan of a web application, wherein a test is sent to a plurality of web application inputs of the web application, wherein the test is selected from the group consisting of cross site scripting, structured query language injection, directory traversal, mis-configurations, and remote command execution vulnerabilities.

11. A computer usable storage medium having a computer usable program code encoded thereon for monitoring a black box web application security scan, the computer usable program code comprising:
computer usable program code for initiating a black box scan of a web application, wherein a test is sent to a plurality of web application inputs of the web application;
computer usable program code for performing a runtime analysis of the black box scan of the web application;
computer usable program code, responsive to performing a runtime analysis of the black box scan of the web application, for identifying an exercised web application input from the plurality of web application inputs, wherein the exercised web application input receives data from the test;
computer usable program code for modifying the black box scan based on the run time analysis of the black box scan to use unexercised web application inputs that did not receive data from the test in a subsequent black box scan of the web application.

12. The computer usable storage medium of claim 11, wherein the computer usable program code further comprises:
computer usable program code for preparing information on the coverage of the plurality of web application inputs, wherein the information includes a percentage of the plurality of web application inputs that are exercised, and a percentage of the plurality of web application inputs that are unexercised.

13. The computer usable storage medium of claim 12, wherein the computer usable program code further comprises:
computer usable program code, responsive to preparing information on the coverage of the plurality of web application inputs, for forwarding the information to a feedback control; and
computer usable program code, responsive to forwarding the information to a feedback control, for modifying the black box scan with the feedback control so that unexercised web application inputs that did not receive data from the test will be exercised by a subsequent black box scan of the web application.

14. The computer usable storage medium of claim 13, wherein the feedback control is a feedback control loop, wherein the computer usable program code further comprises:
computer usable program code, responsive to forwarding the information to a feedback control, for modifying the black box scan with the feedback control during runtime so that unexercised web application inputs that did not receive data from the test will be exercised by a subsequent black box scan of the web application.

* * * * *